(12) United States Patent
Balamurugan et al.

(10) Patent No.: US 9,600,788 B2
(45) Date of Patent: Mar. 21, 2017

(54) CROWDSOURCING DIRECTORY SYSTEM

(71) Applicant: Xerox Corporation, Norwalk, CT (US)

(72) Inventors: Chithralekha Balamurugan, Pondicherry (IN); Koustuv Dasgupta, Bangalore (IN); Karnam Saraschandra, Karnataka (IN); Shourya Roy, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 301 days.

(21) Appl. No.: 13/727,648

(22) Filed: Dec. 27, 2012

(65) Prior Publication Data

US 2014/0188787 A1    Jul. 3, 2014

(51) Int. Cl.
*G06Q 10/06* (2012.01)
*G06Q 30/06* (2012.01)

(52) U.S. Cl.
CPC ..... *G06Q 10/0631* (2013.01); *G06Q 30/0629* (2013.01); *G06Q 30/0631* (2013.01)

(58) Field of Classification Search
CPC ............. G06Q 10/0631; G06Q 10/0629
See application file for complete search history.

(56) References Cited

U.S. PATENT DOCUMENTS

| | | | |
|---|---|---|---|
| 7,284,012 B2 | 10/2007 | Meliksetian et al. | |
| 8,400,948 B2 * | 3/2013 | Owens | 370/270 |
| 8,443,374 B2 * | 5/2013 | Li et al. | 719/310 |
| 2002/0165813 A1 | 11/2002 | Lee | |
| 2002/0165814 A1 | 11/2002 | Lee et al. | |
| 2003/0229529 A1 * | 12/2003 | Mui et al. | 705/8 |
| 2004/0181753 A1 * | 9/2004 | Michaelides | 715/523 |
| 2006/0230033 A1 * | 10/2006 | Halevy et al. | 707/3 |
| 2009/0012983 A1 * | 1/2009 | Senneville | G06F 17/30566 |
| 2009/0157677 A1 * | 6/2009 | Beaver et al. | 707/6 |
| 2010/0198689 A1 * | 8/2010 | Gonen et al. | 705/14.54 |
| 2012/0131572 A1 * | 5/2012 | Shae et al. | 718/1 |
| 2013/0029769 A1 * | 1/2013 | Lee | 463/42 |
| 2013/0084891 A1 * | 4/2013 | Khorashadi et al. | 455/456.3 |

OTHER PUBLICATIONS

Govindaraj, Dinesh, et al. "MoneyBee: Towards enabling a ubiquitous, efficient, and easy-to-use mobile crowdsourcing service in the emerging market." 2011, Bell Labs Technical Journal 15.4 (2011): 79-92.*

(Continued)

*Primary Examiner* — Tarek Chbouki
(74) *Attorney, Agent, or Firm* — Jones Robb PLLC

(57) ABSTRACT

The disclosed embodiments relates to a crowdsourcing directory system. The crowdsourcing directory system is configured for identifying and comparing one or more of a plurality of crowdsourcing platforms based on a plurality of attributes associated with each of the plurality of crowdsourcing platforms. The crowdsourcing directory system then recommends a set of crowdsourcing platforms from the one or more crowdsourcing platforms based on values of the plurality of attributes. The crowdsourcing directory system also maintains a repository of information pertaining to the plurality of crowdsourcing platforms. In an embodiment, the repository may be updated by implementing software adaptors configured to extract various information pertaining to the plurality of crowdsourcing platforms.

14 Claims, 7 Drawing Sheets

(56) References Cited

OTHER PUBLICATIONS

Minder, Patrick, et al. "Crowdmanager-combinatorial allocation and pricing of crowdsourcing tasks with time constraints." 2012, Workshop on Social Computing and User Generated Content.*
How to Choose a Recruitment Agency, Aug. 2012, WikiHow.*
U.S. Appl. No. 13/592,710, filed Aug. 23, 2012; Gujar et al; "Method and System for Recommending Crowdsourcability of A Business Process".

* cited by examiner

Directory of Crowdsourcing Platforms

| Browse | Search | Compare | | Recommend |
|---|---|---|---|---|

Comparison of Platforms for Translation of 2-Pages of Legal documents from English to French

| | | Elance ⌄ | Crowdflower ⌄ | oDesk ⌄ | more |
|---|---|---|---|---|---|
| Functional | Cognitive Nature | Microtask | Knowledge based task | Ideation and Knowledge Based Task | |
| | Size of Tasks | Simple | Short Term | Short and long term | |
| | Work Splitting | By Requester | By Platform | By Requester | |
| | Work Execution | Both Selected and Multiple Workers | Selected Workers | Selected Workers | |
| | Result Aggregation | By Requester | By Platform | By Requester | |
| | Correctness Verification | By Requester | By Platform using Statistical Analysis | By Requester | |
| Non-Functional | Task Completion Time | 2-Hours | 3-Hours | 24-Hours | |
| | Cost ($) | 5 | 7 | 20 | |
| | Speech Based Interface | yes | No | No | |
| | Frequency of Server | <1/Month | <1/Month | <1/Month | |
| | Breakdown Task Accuracy | 0.8 | 0.85 | 0.8 | |

CROWDSOURCING DIRECTORY SYSTEM

TECHNICAL FIELD

The presently disclosed embodiments are related to a crowdsourcing process. More particularly, the presently disclosed embodiments are related to a crowdsourcing directory system.

BACKGROUND

Crowdsourcing has emerged over the past few years as a new mode to organize work. It allows individuals to work and potentially earn without the need for physical co-location, employment contracts, or even an established identity. Thus, individuals and organizations are keen to adopt the process to carry out tasks relating to human computation by utilizing the potential of the open crowd with less overhead. Today, for individuals and organizations, there is a plethora of crowdsourcing platforms, each of which helps crowdsource different kinds of tasks. Each of the crowdsourcing platforms differ from one another, depending on what is crowdsourced and how crowdsourcing is carried out.

There are many stakeholders (individuals and organizations) of crowdsourcing platforms, and they tend to seek different information about crowdsourcing platforms. Information on crowdsourcing platforms is usually scattered across different pages of crowdsourcing platform websites and, at times, not available. Hence, there is a need for a service that provides a single point of comprehensive information dissemination about the various crowdsourcing platforms, and further caters to the information requirements of the various stakeholders of the crowdsourcing platforms.

SUMMARY

According to the embodiments illustrated herein, there is provided a computer implemented method for creating a repository comprising information on a plurality of crowdsourcing platforms. The information comprises values of a plurality of attributes associated with each of the plurality of crowdsourcing platforms. The computer-implemented method includes indentifying one or more crowdsourcing platforms from the plurality of crowdsourcing platforms based on input criteria. The one or more crowdsourcing platforms are the compared based on their associated attributes. The computer-implemented method further includes recommending a set of crowdsourcing platforms from the one or more crowdsourcing platforms. The computer-implemented method further includes updating the repository by implementing software adaptors for the plurality of crowdsourcing platforms.

According to the embodiments illustrated herein, there is provided a crowdsourcing directory system. The crowdsourcing directory system includes a comparator module, a recommendation module, an extraction module, and an updating module. The comparator module is configured for comparing one or more of a plurality of crowdsourcing platforms based on a plurality of attributes associated with each of the plurality of crowdsourcing platforms. The recommendation module is configured for recommending a set of crowdsourcing platforms from the one or more crowdsourcing platforms based on values of the plurality of attributes. The extraction module is configured for extracting, using software adaptors, one or more values of one or more of the plurality of attributes associated with each of the plurality of crowdsourcing platforms. The updating module configured for updating a repository of the plurality of crowdsourcing platforms based on the extracted one or more values.

According to the embodiments illustrated herein, there is provided a computer program product for use with a computer for creating and updating a repository. The computer-readable program code includes program instruction means for creating a repository comprising information on a plurality of crowdsourcing platforms. The information comprises values of a plurality of attributes associated with each of the plurality of crowdsourcing platforms. The computer-readable program code further includes program instruction means for indentifying one or more crowdsourcing platforms from the plurality of crowdsourcing platforms based on input criteria. The computer-readable program code further includes program instruction means for comparing the one or more crowdsourcing platforms based on their associated attributes. The computer-readable program code further includes program instruction means for recommending a set of crowdsourcing platforms from the one or more crowdsourcing platforms. The computer-readable program code further includes program instruction means for updating the repository by implementing software adaptors for the plurality of crowdsourcing platforms.

According to the embodiments illustrated herein, there is provided a computer implemented method for creating a repository comprising information on a plurality of crowdsourcing platforms. The information comprises values of a plurality of attributes associated with each of the plurality of crowdsourcing platforms. The computer-implemented method includes comparing one or more of the plurality of crowdsourcing platforms based on the associated attributes; and updating the repository by implementing software adaptors for the plurality of crowdsourcing platforms.

BRIEF DESCRIPTION OF DRAWINGS

The accompanying drawings illustrate the various embodiments of systems and methods, and the embodiments of various other aspects of the invention. Any person with ordinary skill in the art will appreciate that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate, and not to limit, the scope in any manner, wherein like designations denote similar elements, and in which:

FIG. 5 is a user interface to access a crowdsourcing directory system, in accordance with at least one embodiment.

DETAILED DESCRIPTION

Figure 1:
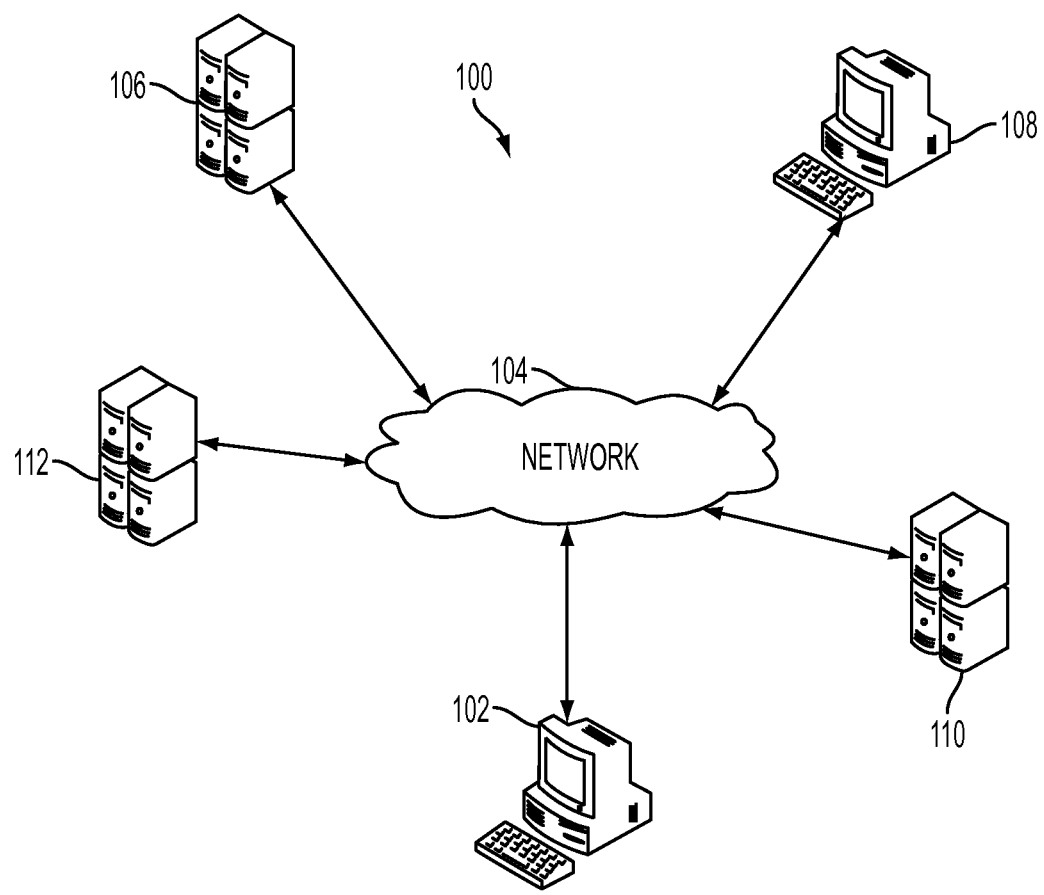
FIG. 1 is a block diagram that illustrates a system environment, in accordance with various embodiments.

The present disclosure is best understood with reference to the detailed figures and description set forth herein. Various embodiments are discussed below with reference to the figures. However, those skilled in the art will readily appreciate that the detailed descriptions given herein, with respect to the figures, are simply for explanatory purposes, as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example," "for example," "at least one embodiment," and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the respective meaning set forth below.

A "network" refers to a medium that connects various computing devices, crowdsourcing platform servers, and an application server. Examples of a network include, but are not limited to, LAN, WLAN, MAN, WAN, and the Internet. Communication over the network may be performed in accordance with various communication protocols such as transmission control protocol and internet protocol (TCP/IP), user datagram protocol (UDP), and IEEE 802.11n communication protocols.

A "computing device" refers to a computer, a device with a processor/microcontroller and/or any other electronic component, or a device or a system that performs one or more operations according to one or more programming instructions. Examples of a computing device include, but are not limited to, a desktop computer, a laptop, a personal digital assistant (PDA), a tablet computer (e.g., iPad®, Samsung Galaxy Tab®) and the like.

"Crowdsourcing" refers to distribution of tasks by soliciting the participation of defined user groups. A group of users may include, for example, individuals who respond to a solicitation posted on a certain website (e.g., a crowdsourcing platform), such as Amazon Mechanical Turk or Crowd Flower.

"A crowdsourcing platform" refers to a business application, wherein a broad, loosely defined as an external group of people, a community, or an organization, provides solutions as an output for any specific business processes received by the application as an input. In an embodiment, the business application can be hosted online on a web portal (e.g., a crowdsourcing platform server). Various examples of the crowdsourcing platforms include, but are not limited to, Amazon Mechanical Turk or Crowd Flower.

"Crowdworkers" refer to a worker or a group of workers who may perform one or more tasks that generate data that contribute to a defined result, such as proofreading part of a digital version of an ancient text or analyzing a small quantum of a large volume of data. Hereinafter, "crowdsourced workforce," "crowdworker," "crowd workforce," and "crowd" may be interchangeably used.

"Task" refers to the work that needs to be completed by crowdworkers.

FIG. 1 is a block diagram that illustrates a system environment 100, in accordance with at least one embodiment. The system environment 100 includes a computing device 102, a network 104, an application server 106, a requester computing device 108, and crowdsourcing platform servers (110, 112).

FIG. 1 shows only one type (e.g., desktop computer) of computing device (102, 108) for simplicity. However, it will be apparent to a person with ordinary skill in the art that the disclosed embodiments can be implemented for a variety of computing devices, including, but not limited to, a desktop computer, a laptop, a PDA, a tablet computer, and the like.

The crowdsourcing platform servers (110, 112) are devices or computers that host one or more crowdsourcing platforms and are interconnected to the computing device 102 over the network 104.

In an embodiment, users of the computing device 102 are hereinafter referred to as crowdworkers, crowd, or crowd workforce. In an embodiment, a user of the requester computing device 108 (hereinafter, referred to as a requester) may submit various tasks to be crowdsourced in the one or more crowdsourcing platforms.

In an embodiment, the application server 106 hosts a crowdsourcing directory. In this case, the requester accesses the application server 110 over the network 104 to access the crowdsourcing directory (possibly through a web-based interface or a client application). In an embodiment, software adaptors may be configured at the application server 106 to extract values of a plurality of attributes corresponding to the one or more crowdsourcing platforms.

In another embodiment, the crowdsourcing directory application may be hosted/installed on the computing device 102.

Figure 2:
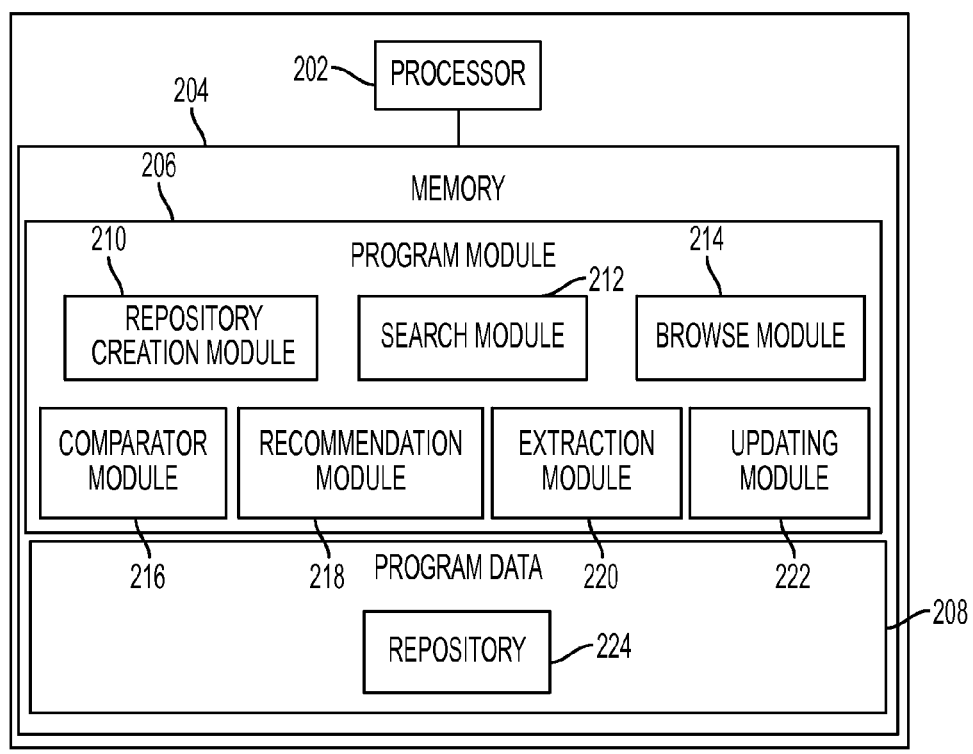
FIG. 2 is a block diagram that illustrates a crowdsourcing directory system, in accordance with various embodiments.

FIG. 2 is a block diagram that illustrates a crowdsourcing directory system 200, in accordance with various embodiments. In an embodiment, the crowdsourcing directory system 200 may correspond to the computing device 102 or the application server 106.

The crowdsourcing directory system 200 includes a processor 202 and a memory 204. The processor 202 is coupled with the memory 204.

The processor 202 is configured to execute a set of instructions stored in the memory 204 to perform one or more operations. The processor 202 fetches the set of instructions from the memory 204 and executes the set of instructions. The processor 202 can be realized through a number of processor technologies known in the art. Examples of a processor include an X86 processor, a RISC processor, or an ASIC processor. In an embodiment, the processor 202 includes a graphics processing unit (GPU) that executes the set of instructions to perform one or more processing operations.

The memory 204 is configured to store the set of instructions or modules. Some of the commonly known memory implementations may be, but are not limited to, a random access memory (RAM), a read-only memory (ROM), a hard disk drive (HDD), and a secure digital (SD) card. The memory 204 includes a program module 206 and a program data 208. The program module 206 includes a set of instructions that are executable by the processor 202 to perform specific actions to manage the distribution of tasks. It is understood by a person with ordinary skill in the art that the set of instructions, in conjunction with the various hardware of the system 200, enable the system 200 to perform various operations. The program module 206 includes a repository creation module 210, a search module 212, a browse module 214, a comparator module 216, a recommendation module 218, an extraction module 220, and an updating module 222.

The repository creation module 210 is configured to create a repository 224, comprising information on a plurality of crowdsourcing platforms. The information includes values of a plurality of attributes associated with each of the plurality of crowdsourcing platforms. In an embodiment, the repository 224 further stores the data submitted from and/or required by the search module 212, the browse module 214, the comparator module 216, the recommendation module 218, the extraction module 220, and the updating module 222. In an embodiment, the repository 224 can be implemented using technologies, including, but not limited to Oracle®, IBM DB2®, Microsoft SQL Server®, Microsoft Access®, PostgreSQL®, MySQL®, and SQLite®.

To create the repository 224, the repository creation module 210 collects information from a user or group of users that identify one or more stakeholders associated with the plurality of crowdsourcing platforms. In an embodiment, the stakeholders of the plurality of crowdsourcing platforms may include, but are not limited to, the various users who seek interest with the plurality of crowdsourcing platforms or access the plurality of crowdsourcing platforms for various purposes. The stakeholders may include, but are not limited to, general users, requesters, workers, crowdsourcing platform developers, crowdsourcing platform service providers, and crowdsourcing platform information analyzers.

The repository creation module 210 further receives information from a user or group of users about the identification of one or more information requirements of the one or more stakeholders. In an embodiment, the one or more information requirements of the general user may include, but are not limited to, crowdsourcing platforms offering image-labeling services, crowdsourcing platforms of European origin, or crowdsourcing platforms that support physically challenged people. In an embodiment, the one or more information requirements of the requester may include, but are not limited to, a list of crowdsourcing platforms with least turnaround time for text digitization with quality assurance, a list of crowdsourcing platforms with discussion room and work monitoring facilities, or a list of crowdsourcing platforms that provide services 24×7. In an embodiment, the one or more information requirements of the workers may include, but are not limited to, a list of micro-task platforms with payment guarantees, or a list of project platforms with programming jobs paid more than $50. In an embodiment, the one or more information requirements of the platform developers may include, but are not limited to, a list of crowdsourcing platforms with job posting APIs or a list of crowdsourcing platforms with real time crowdsourcing. In an embodiment, the one or more information requirements of the crowdsourcing platform service providers may include, but are not limited to, a list of crowdsourcing platforms with more worker features and a list of crowdsourcing platforms with many social networking links. In an embodiment, the one or more information requirements of the crowdsourcing platform information analyzers may include, but are not limited to, a list of crowdsourcing platforms that have the largest job postings or a list of crowdsourcing platforms that have the largest number of workers. In an embodiment, the identified one or more information requirements of the one or more stakeholders are stored in the repository 224.

The repository creation module 210 further receives information from a user or a group of users about the classification of the one or more information requirements into one or more information dimensions. The one or more information dimensions pertain to a plurality of attributes. The information requirements include values of the plurality of attributes associated with each of the plurality of crowdsourcing platforms. In another embodiment, the repository creation module 210 receives information from the user or the group of users about the one or more information requirements, and then automatically classifies the one or more information requirements into one or more information dimensions.

In an embodiment, the plurality of attributes includes a set of functional parameters and a set of non-functional parameters. The functional parameters correspond to the functional aspects of the plurality of crowdsourcing platforms, and the non-functional parameters correspond to the performance, accessibility, and availability of the plurality of crowdsourcing platforms. In an embodiment, the set of functional parameters and the set of non-functional parameters together constitute a complete characterization of the plurality of crowdsourcing platforms.

In another embodiment, the set of functional attributes comprises at least one type of crowdsourcing platform, type of crowdsourcing task supported by the crowdsourcing platform, or features supported by the crowdsourcing platform. In another embodiment, the set of non-functional attributes comprises at least one of cost, accuracy, response time, or task completion rate.

In yet another embodiment, the set of functional parameters corresponds to crowdsourcing platform details and crowdsourcing details. The crowdsourcing platform details include preliminary details, dashboard details, and features details. The crowdsourcing details include work details, worker details, and payment details. In yet another embodiment, the set of non-functional parameters corresponds to performance-based characterization, accessibility-based characterization, or availability-based characterization.

The repository creation module 210 further receives information from a user or a group of users about the identification of one or more parameters and their values associated with the one or more attributes. In an embodiment, the one or more parameters are identified to capture the details of each of the plurality of crowdsourcing platforms. In one embodiment, the values of the one or more parameters associated with the one or more attributes is arrived at by analyzing the plurality of crowdsourcing platforms. In another embodiment, the values of the one or more parameters associated with the one or more attributes is specified by the crowdsourcing platform service provider.

In an embodiment, the one or more parameters may include dashboard-related parameters such as the number of jobs posted, features-related parameters such as technical features, worker-related parameters such as work execution models, worker detail-related parameters such as worker selection for performing tasks, payment-related parameters such as payment modes, and performance-related parameters such as accuracy.

The following tables (Table.1 to Table.9) show the various parameters and their corresponding values. It is to be noted that the parameters and their corresponding values mentioned in the following tables are illustrative and should not be considered limiting the scope of the ongoing description. Any other suitable examples of the parameters and their corresponding values can be considered without deviating from the scope of the ongoing description.

Table 1 depicts the identified parameters and their values:

TABLE 1

| S. No. | Parameter | Values |
|---|---|---|
| | Type of platform | Intermediary/Facilitator |
| | | Between requester and worker |
| | | Between requester and other platforms |
| | | Part of an organization |
| | | Hireable platform |
| | | Integrable with enterprise applications |
| | Number of classes of tasks crowdsourced | Single |
| | | Multiple |
| | Size of task crowdsourced by platform | Simple task |
| | | Project task |
| | | Short term |
| | | Long term |
| | Type of task crowdsourced by platform | Crowdfunding |
| | | Cloud labor |
| | | Crowd creativity |
| | | Distributed knowledge development |
| | | Open innovation |
| | Cognitive nature and the name of the task crowdsourced by platform | Ideation-based task |
| | | Idea generation |
| | | R&D |
| | | Design and optimization |
| | | Knowledge-based task |
| | | Content generation |
| | | Content management |
| | | Location services |
| | | Survey production |
| | | Internet search |
| | | Expertise-based task |
| | | Translation |
| | | Monitoring |
| | | Business analytics |
| | | Customer support |
| | | Sales and marketing |
| | | Application services |
| | | Legal services |
| | | Education |
| | | Industry specific |
| | | Software development |
| | | Micro-task |
| | | Categorization |
| | | Transcription |
| | | Data management |
| | | OCR validation |
| | Clients serviced by platform | Open |
| | | Specific |
| | | Corporations |
| | | Enterprises |
| | | Entrepreneurs |
| | | Academia |
| | | Government |
| | | Non profits |
| | | Partners |
| | Country of origin of platform | India |
| | | USA |
| | | UK |
| | Website | Website address of the platform |

Table 2 depicts the identified dashboard-related parameters and their values:

TABLE 2

| S. No. | Parameter | Value |
|---|---|---|
| | Number of jobs posted | Quantative value in the platform instance described |
| | Number of active requesters | Quantative value in the platform instance described |
| | Number of active workers | Quantative value in the platform instance described |
| | Amount earned by workers through this platform | Quantative value in the platform instance described |
| | Range of payment for works | Quantative value in the platform instance described |
| | Most requested skills | Quantative value in the platform instance described |
| | Earning distribution (by services sector) | Quantative value in the platform instance described |

Table 3 depicts the identified feature-related parameters and their values:

TABLE 3

| Parameter | Sub Parameter | Values |
|---|---|---|
| Requester Worker-based features | Features for Requester | Job posting wizard |
| | | Job posting API interface |
| | | Search and list workers fitting requirements |
| | | By skill set |
| | | By demography |
| | | Dashboard |
| | | Status |
| | | Ranking of workers |
| | | Settlement of disputes with worker |
| | | Showcase requester profile |
| | | Assistance for contract agreement with workers |
| | | Mentor assistance |
| | Features for worker | Job search |
| | | By creation date |
| | | Number of tasks available |
| | | Reward amount |
| | | Expiration date |
| | | Title (a-z or z-a) |
| | | Time allotted (shortest or longest) |
| | | Dashboard |
| | | Status |
| | | Payment guarantee |
| | | Improving skill by taking skill test and automatic update of profile |
| | | Facility for showcasing talents |
| | | Insurance for workers |
| | | Establishing connections |
| | | Find friends and colleagues |
| | | Networking |
| | | Meet people who share our interest |
| | | See how our ranking changes with respect to our network peers as we solve problems |
| Technical features | | API interface for the platform |
| | | Support for real-time crowdsourcing |
| | | Translation of work specification to different languages |
| Support features | | Integration with social networking sites such as |
| | | Facebook and LinkedIn |
| | | Project research forums |
| | | Help desk |
| | | Outsourcing advice |
| | | Library |

Table 4 depicts the identified worker-related parameters and their values:

TABLE 4

| S. No. | Parameter | Sub Parameter | Values for Micro-task Crowdsourcing Platforms | Values for Project Crowdsourcing Platforms |
|---|---|---|---|---|
| | Work | Work splitting | Done by requester<br>Done by platform<br>Done by crowd<br>Not applicable if only micro-tasks are submitted | Done by requester<br>Done by platform |
| | | Work to worker assignment cardinality | One to one<br>One to many<br>Many to one<br>Many to many | Done by requester<br>Done by platform |
| | | Work execution model | Work executed by selected worker(s) many workers in a competitive manner many workers in a collaborative problem-solving manner | Work executed by selected worker(s) many workers in a collaborative problem-solving manner |
| | | Iterations of work execution | Single iteration<br>Multi-iterative | Single iteration<br>Phased execution |
| | | Result aggregation | Done by requester<br>Done by platform<br>Done by crowd<br>Done automatically | Done by requester<br>Done by platform |
| | | Verifying correctness of solution | Redundant work execution by multiple workers followed by<br>Requester selecting best solution<br>Best solution identified by voting by crowd<br>Verification done by crowd<br>Automatic verification | Done by requester<br>Done by platform |
| | | Work quality assurance | Worker verification<br>Continual rating of worker<br>Random testing<br>Statistical filtering<br>Peer and multilevel reviews<br>Using reputation systems<br>Automatic checks | Done by requester<br>Done by platform |
| | | Work management features supported | Not required for micro-tasks | Project room facility with<br>Private discussion forums<br>File management<br>Messaging<br>Work progress monitoring tools<br>Monitoring hours worked<br>Monitoring status of work<br>Real-time communication with contractors and internal team |

Table 5 depicts the identified worker details related parameters and their values:

TABLE 5

| S. No. | Parameter | Sub Parameter | Values for Micro-task Crowdsourcing Platforms | Values for Project Crowdsourcing Platforms |
|---|---|---|---|---|
| | Worker | Worker selection for performing task | Pull - anybody can perform the job<br>Worker selects himself by qualifying in the pre-test for taking up the job<br>Work is pushed to expert worker(s) selected by requester<br>Platform allocates work according to workers' skills<br>Workers are classified in different categories | Worker selects himself by qualifying in pre-test for taking up the job<br>Work is pushed to expert worker(s) selected by requester<br>Crowdsourcer (e.g., requester) hires his own team by inviting proposals and evaluating them<br>Crowdsourcer invites workers he may know, to |

TABLE 5-continued

| S. No. | Parameter | Sub Parameter | Values for Micro-task Crowdsourcing Platforms | Values for Project Crowdsourcing Platforms |
|---|---|---|---|---|
| | | | according to expertise; worker selects category of worker to do the task | work in his team |
| | | Worker groups used for crowdsourcing | Open Students as in Brain Rack Work given to predefined crowd - youth, women | Open Internal employees Registered contract Workers Online communities Academia |
| | | Worker Demography | Open Specific to certain countries | Open Internal employees Registered contract Workers Online communities Academia |
| | | Worker classification categories | Based on the accuracy of work done Masters others | Based on experience Newbue Junior Promise Senior expert Based on size Basic Individual Small business Large business |

Table 6 depicts the identified payment-related parameters and their values:

TABLE 6

| S. No. | Parameter | Sub Parameter | Values for Micro-task Crowdsourcing Platforms | Values for Project Crowdsourcing Platforms |
|---|---|---|---|---|
| | Payment | Type of payment | Pay for work | Hourly payment Fixed price payment |
| | | Payment mode | Platform not involved in payment between requester and worker Payment through Escrow account maintained by platform Online payments | Hourly payment Fixed price payment |
| | | Share of payment | Payment shared between platform and worker Is a nonprofit platform and does not share payment with worker | Payment shared between platform and worker |

Table 7 depicts the identified performance-related parameters and their values:

TABLE 7

| S. No. | Parameter | Value |
|---|---|---|
| | Task completion time | Measured in seconds/minutes/hours |
| | Task accuracy | Between 0 and 1 computed specific to the task |
| | Cost | Number of cents paid for each task |
| | Rating | Worker rating |
| | Expertise | Beginner/Intermediate/Expert |

Table 8 depicts the identified accessibility-related parameters and their values:

TABLE 8

| S. No. | Parameter | Value |
|---|---|---|
| | Custom font size | Yes/No |
| | Speech-based interface | Yes/No |

Table 9 depicts the identified availability-related parameters and their values:

TABLE 9

| S. No. | Parameter | Value |
|---|---|---|
| | Frequency of server breakdown | Numerical value/week/month |
| | Average uptime | Seconds |

The search module 212 is configured to search for data (a list of crowdsourcing platforms) from the repository 224 satisfying a search query/criteria containing one or more search terms. The search module 212 is further stores the list of the crowdsourcing platforms identified in response to the search query in to the program data 208. In an embodiment, the search query may be inputted, for example, by a user of the computing device 102 via the web browser. The search module 212 may implement various search applications or search engines.

The browse module 214 obtains the list of the crowdsourcing platforms from the program data 208. The browse module 214 is configured to present the list crowdsourcing platforms. In an embodiment, the browse module 214 is configured to output the list of all crowdsourcing platforms stored in the program data 208 in alphabetical order to a requester.

Figure 4:
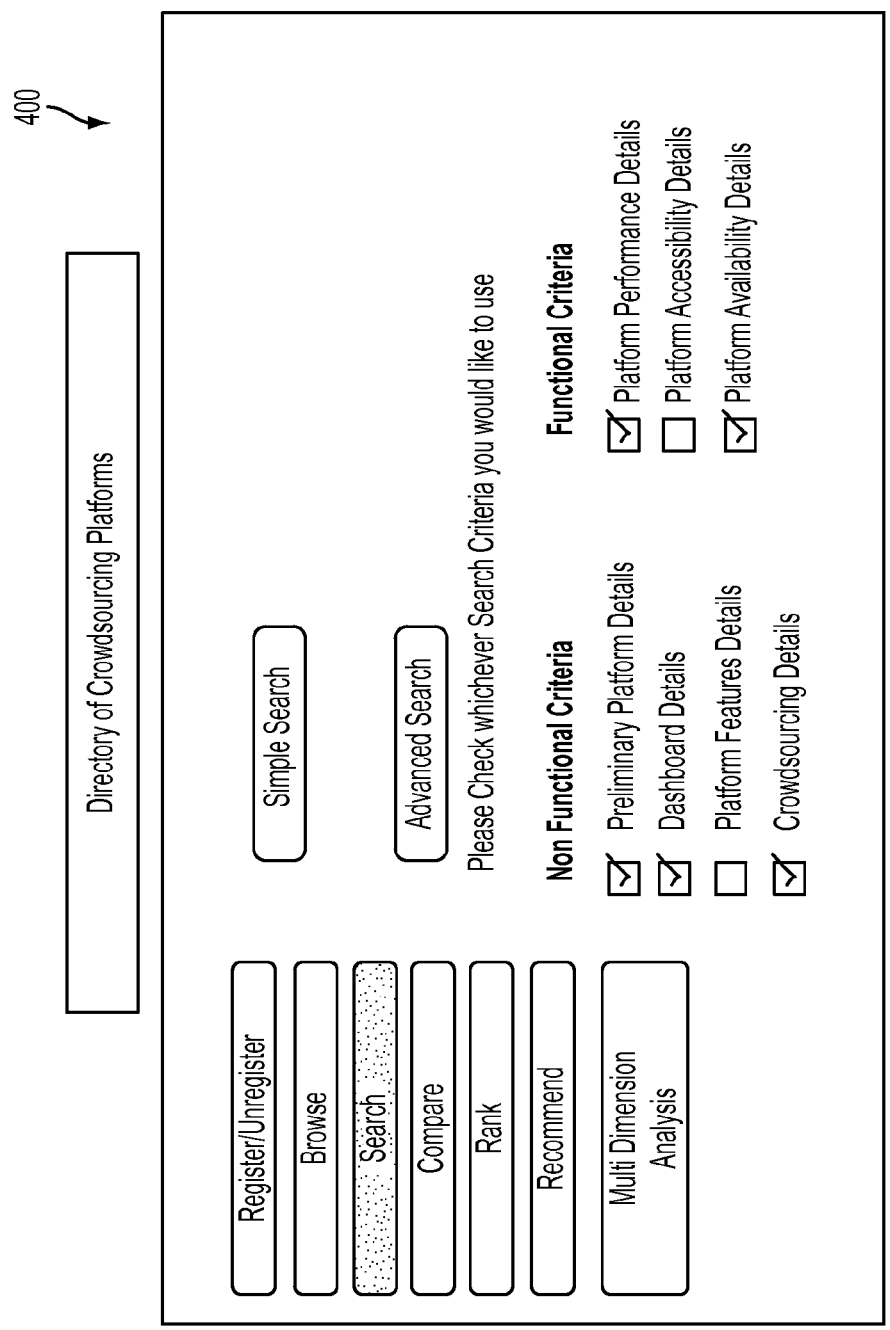
FIG. 4 is a user interface to access a crowdsourcing directory system, in accordance with at least one embodiment.

The comparator module 216 is configured to establish and maintain communication with the repository creation module 210. The comparator module 216 is configured to identify one or more crowdsourcing platforms from the plurality of crowdsourcing platforms based on input criteria. In an embodiment, the input criteria may include one or more attributes of the plurality of attributes. The identification of one or more crowdsourcing platforms from the plurality of crowdsourcing platforms based on the input criteria will now be explained in conjunction with FIG. 4. FIG. 4 is a user interface 400 to access a crowdsourcing directory system 200, in accordance with at least one embodiment. As shown in FIG. 4, the input criteria may include a set of non-functional attributes such as preliminary platform details, dashboard details, platform feature details, and crowdsourcing details. The set of functional attributes of the search criteria may include platform performance details, platform accessibility details, and platform availability details.

The comparator module 216 is configured to compare one or more of the plurality of crowdsourcing platforms based on the plurality of attributes associated with each of the plurality of crowdsourcing platforms. The comparator module 216 retrieves the information on the one or more of the plurality of crowdsourcing platforms and the plurality of attributes associated with each of the plurality of crowdsourcing platforms from the repository 224, and then compares the plurality of crowdsourcing platforms against each other, based on the plurality of attributes. In an embodiment, the comparison is performed based on one or more comparison techniques. In an embodiment, the one or more comparison techniques include, but are not limited to, a comparator operator-based approach with "Boolean" output, a comparator operator-based approach with "score" output, or the like. The comparison of one or more of the plurality of crowdsourcing platforms based on the plurality of attributes will now be explained in conjunction with FIG. 5. FIG. 5 is a user interface 500 to access a crowdsourcing directory system 200, in accordance with at least one embodiment. As shown in FIG. 5, a comparison matrix of three crowdsourcing platforms, namely, Elance, Crowd Flower, and cDesk, is shown based on the plurality of functional and non-functional attributes. The functional attributes include cognitive nature, size of tasks, work splitting, work execution, result aggregation, and correction verification. The non-functional attributes includes task completion time, cost, speech-based interface, frequency of server breakdown, and task accuracy.

In an embodiment, the recommendation module 218 is configured to recommend a set of crowdsourcing platforms from the plurality of crowdsourcing platforms, based on the values of the plurality of attributes. In another embodiment, the recommendation module 218 recommends the crowdsourcing platforms based on the comparison performed by the comparator module 216.

In an embodiment, the recommendation module 218 is further configured to rank the plurality of crowdsourcing platforms. The rank is assigned to the suitable set of plurality of crowdsourcing platforms based on pre-defined criteria. In an embodiment, the pre-defined criteria include rules, according to which each of the plurality of crowdsourcing platforms is assigned a numerical value based on a degree of matching. The numerical value assigned to each of the crowdsourcing platforms defines a rank number for each of the plurality of crowdsourcing platforms.

Figure 3:
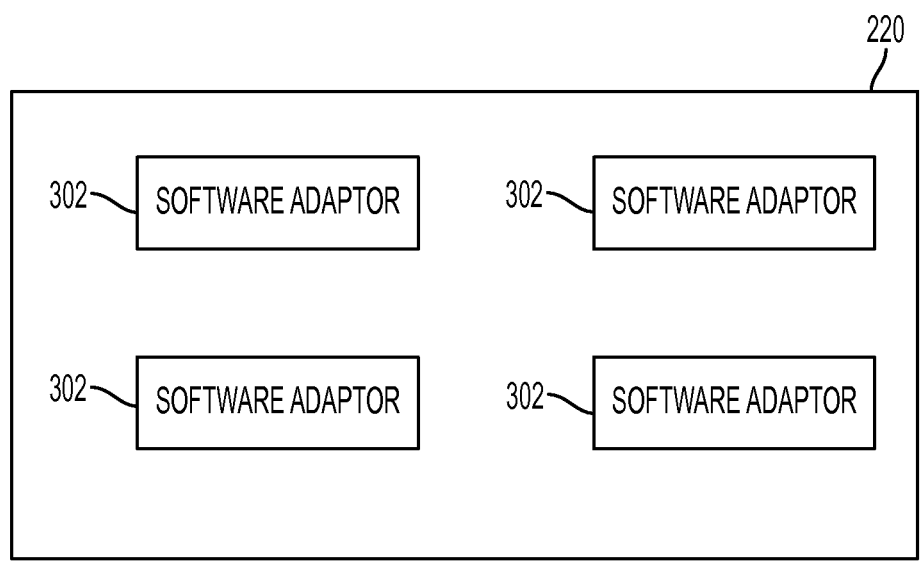
FIG. 3 is a block diagram that illustrates an extraction module of a crowdsourcing directory system, in accordance with an embodiment.

The extraction module 220 is configured to extract, using one or more software adaptors, one or more values of one or more of the plurality of attributes associated with each of the plurality of crowdsourcing platforms. The extraction module 220 will now be explained in conjunction with FIG. 3. FIG. 3 is a block diagram that illustrates an extraction module 220 of a crowdsourcing directory system 200, in accordance with various embodiments.

In an embodiment, the extraction module 220 is operable to analyze the plurality of crowdsourcing platforms to extract one or more values of one or more of the plurality of attributes associated with each of the plurality of crowdsourcing platforms. In some implementations, the extraction module 220 performs these operations in response to the processor 202, executing software instructions contained in a computer-readable medium, such as the memory 204. In some implementations, the software instructions for extracting attributes are included in the extraction module 220 within the memory 204. The extraction module 220 can analyze the plurality of crowdsourcing platforms to extract related attributes from the plurality of crowdsourcing platforms.

In an embodiment, the extraction module 220 is configured to create at least one software adaptor based on at least a set of plurality of non-functional attributes. In another embodiment, the extraction module 220 is configured to create at least one software adaptor based on the set of plurality of non-functional attributes and the set of plurality of functional attributes. In one embodiment, the extraction module 220 configures the software adaptors for the one or more of the plurality of crowdsourcing platforms. In another embodiment, the extraction module 220 configures the software adaptors at the one or more of the plurality of crowdsourcing platforms. For example, a software adaptor 302 may be configured at the Amazon Mechanical Turk crowdsourcing platform, a software adaptor 304 may be configured at the Elance crowdsourcing platform, a software adaptor 306 may be configured at the Crowdflower crowdsourcing platform, and a software adaptor 308 may be configured at the Mobileworks crowdsourcing platform.

In an embodiment, the software adaptors (302-308) are generic in the sense that the knowledge and requirements of the source and target of the information transfer are stored in a knowledge base separate from the repository 224 for transferring the information. Therefore, the facility for transferring the information can be adapted or reused for specific (source, target) pairs by appropriate modification of the knowledge base.

In one embodiment, any of the software adaptors (302-308) accesses the information from the plurality of crowdsourcing platforms to determine what information is mapped from a source stream to a target stream, and how to transform the mapped information. There is no need to update the information in the repository 224, unless there is a change in the source or target format of the mapped information. In this way, the user does not have to rely on a specific system, but instead can select what he or she wants.

The software adaptors (302-308) communicate the one or more extracted values of one or more of the plurality of attributes associated with each of the plurality of crowdsourcing platforms with the updating module 222. The updating module 222 then updates the repository 224, based on the one or more values of the one or more of the plurality of attributes associated with each of the plurality of crowdsourcing platforms. In an embodiment, the values that correspond to the plurality of attributes for each of the plurality of crowdsourcing platforms are updated in real time at predefined time intervals by the updating module 222. In an embodiment, the process of updating information repository is performed in two ways: proactively and reactively.

In a proactive update, the updating module 222 facilitates injecting a batch of tasks to the crowdsourcing platforms and uses the software adaptors (302-308) to extract values for different parameters such as task-completion time and accuracy. In a reactive update, the updating module 222 extracts the values for parameters using the software adaptors (302-308) and updates the repository 224. In an embodiment, the software adaptors (302-308) may be application-programming interfaces (APIs).

Figure 6A:
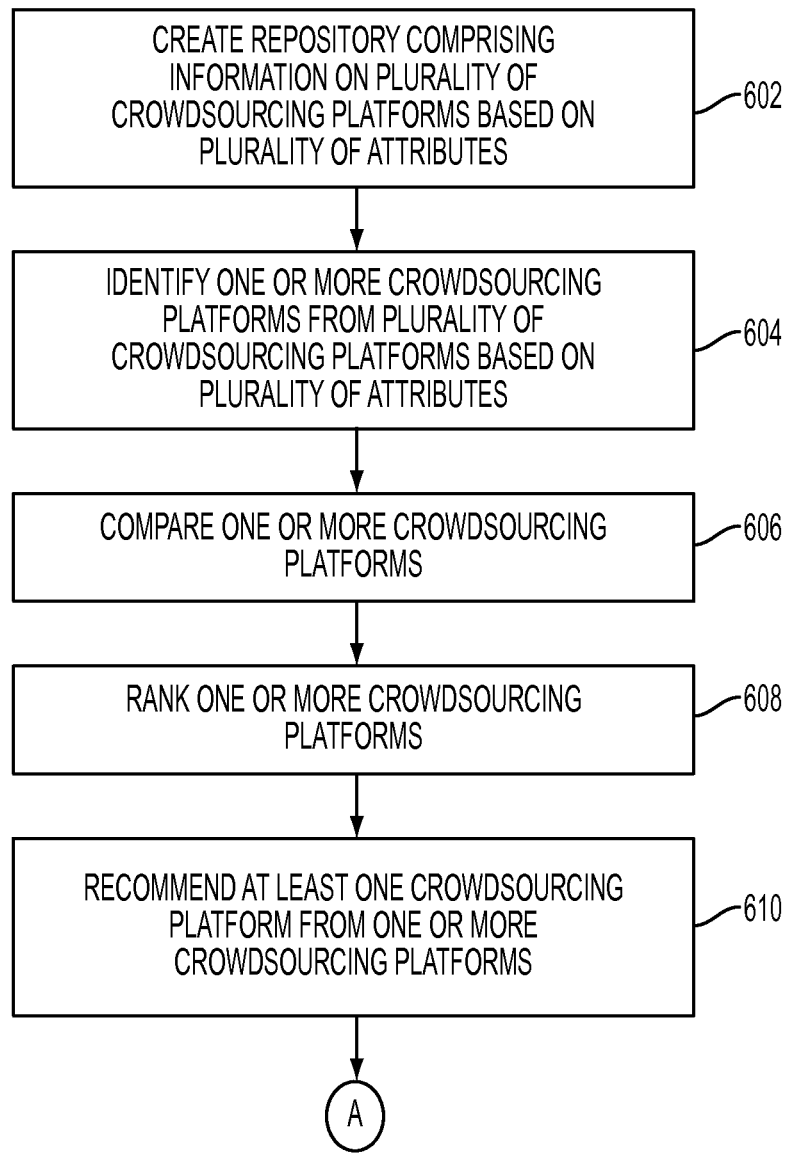
FIGS. 6a and 6b are flow diagrams that illustrate a method implementable on a crowdsourcing directory system, in accordance with at least one embodiment.
Figure 6B:
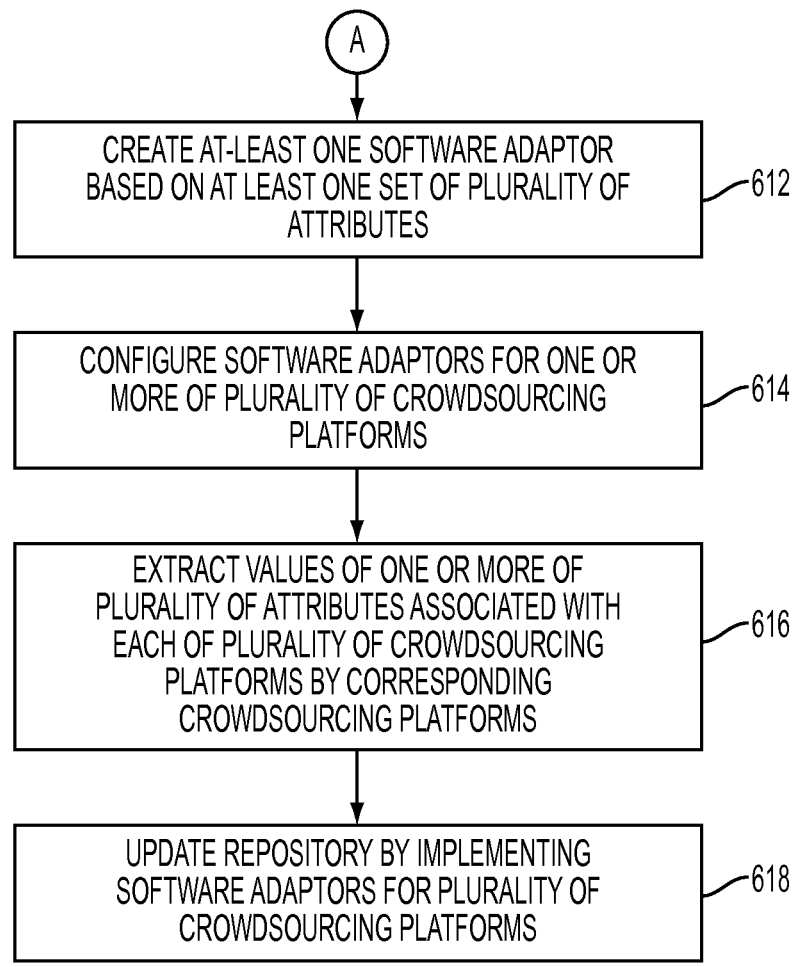

FIGS. 6a and 6b are flow diagrams that illustrate a method implementable on a crowdsourcing directory system, in accordance with at least one embodiment.

At step 602, a repository, including information on a plurality of crowdsourcing platforms, is created. In an embodiment, the repository creation module 210 creates the repository 224, comprising information on the plurality of crowdsourcing platforms. The information includes values of a plurality of attributes associated with each of the plurality of crowdsourcing platforms (as discussed in FIG. 2).

At step 604, one or more crowdsourcing platforms are identified from the plurality of crowdsourcing platforms. In an embodiment, the comparator module 216 identifies the one or more crowdsourcing platforms from the plurality of crowdsourcing platforms, based on input criteria. In an embodiment, the input criteria may be inputted by the user and pertains to the one or more attributes of the plurality of attributes.

At step 606, one or more crowdsourcing platforms are compared. In an embodiment, the comparator module 216 generates the comparison matrix. The comparison matrix contains the results of the comparison between the one or more of the plurality of crowdsourcing platforms, based on the plurality of attributes associated with each of the plurality of crowdsourcing platforms. The comparison between the one or more of the plurality of crowdsourcing platforms is performed based on one or more pre-specified comparison techniques described in FIG. 2.

At step 608, one or more crowdsourcing platforms are ranked. In an embodiment, the recommendation module 218 determines and assigns the rank order of each of the plurality of crowdsourcing platforms, based on the one or more pre-specified ranking techniques. The ranking of the plurality of crowdsourcing platforms is assigned based on the degree of matching of the one or more of the plurality of crowdsourcing platforms with each other, based on the plurality of attributes associated with each of the plurality of crowdsourcing platforms. In an embodiment, the rank order is assigned in order of the decreasing degree of matching.

For example, in response to a user requirement (e.g., search query/criteria) of crowdsourcing platforms which perform data digitization with an accuracy of 95%, the crowdsourcing platform with 86% accuracy will be ranked first and the crowdsourcing platform with 92% accuracy will be ranked at the bottom, if there are 3 crowdsourcing platforms in the repository 220 with 86% accuracy, 92% accuracy and 90% accuracy, respectively. In an alternate embodiment, the rank order is assigned in order of the increasing degree of matching.

At step 610, at least one crowdsourcing platform from one or more crowdsourcing platforms is recommended. In an embodiment, the recommendation module 218 recommends at least one crowdsourcing platform from the plurality of crowdsourcing platforms, based on the values of the plurality of attributes. The process of providing recommendation has been explained in detail in conjunction with the detailed description of FIG. 2. At step 612, the software adaptors (302-308) are created based on at least one set of plurality of non-functional attributes. In an embodiment, the extraction module 218 creates at least one software adaptor. In another embodiment, the extraction module may use pre-created and programmed software adaptors (302-308).

At step 614, software adaptors (302-308) are configured for one or more of the plurality of crowdsourcing platforms. In one embodiment, the extraction module 218 configures the software adaptors for the one or more of the plurality of crowdsourcing platforms. In another embodiment, the extraction module 218 configures the software adaptors at the one or more of the plurality of crowdsourcing platforms.

At step 616, the values of one or more of plurality of attributes associated with each of plurality of crowdsourcing platforms is extracted by corresponding software adaptors (302-308). In an embodiment, the extraction module 218 using software adaptors (302-308) is operable to analyze the plurality of crowdsourcing platforms to extract one or more values of one or more of the plurality of attributes associated with each of the plurality of crowdsourcing platforms. In another embodiment, the extraction module 218 performs the extraction operations using software adaptors (302-308) in response to the processor 202 executing software instructions contained in a computer-readable medium, such as the memory 204.

At step 618, update repository by implementing software adaptors (302-308) for plurality of crowdsourcing platforms. In an embodiment, the software adaptors (302-308) communicate the one or more extracted values of one or more of the plurality of attributes associated with each of the plurality of crowdsourcing platforms with the updating module 222. The updating module 222 then updates the repository 224, based on the extracted one or more values of the one or more of the plurality of attributes associated with each of the plurality of crowdsourcing platforms.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive, such as, a floppy-disk drive or an optical-disk drive. The storage device may also be a means for loading computer programs or other instructions into the computer system. The computer system also includes a communication unit. The communication unit allows the computer to connect to other databases and the internet through an input/output (I/O) interface, allowing the transfer as well as the reception of data from other databases. The communication unit may include a modem, an Ethernet card, or other similar devices, which enable the computer system to connect to databases and networks, such as, LAN, MAN, WAN, and internet. The computer system facilitates inputs from a user through input device, accessible to the system through an I/O interface.

The computer system executes a set of instructions that are stored in one or more storage elements, to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages, including, but not limited to, "C", "C++", "Visual C++", and "Visual Basic". Further, the software may be in the form of a collection of separate programs, a program module containing a larger program, or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in various operating systems and platforms, including, but not limited to, "Unix", "DOS", "Android", "Symbian", and "Linux".

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product for a crowdsourcing directory, as described above, have various advantages. The disclosed crowdsourcing directory system helps to fulfill the information needs about various crowdsourcing platforms to the different stakeholders in a single directory. The crowdsourcing directory system further provides for a complete and comprehensive information service for crowdsourcing platforms such as browse, search, compare, rank, etc., for any required criteria of the stakeholders.

Various embodiments of the crowdsourcing directory system have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person with ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and is not limited to any particular computer hardware, software, middleware, firmware, microcode, etc.

The claims can encompass embodiments for hardware, software, or a combination thereof.

It will be appreciated that variants of the above disclosed, and other features and functions, or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:
1. A computer implemented method comprising:
creating, using a plurality of software adaptors, a repository of information on a plurality of crowdsourcing platforms, the information comprising values of a plurality of attributes associated with each of the plurality of crowdsourcing platforms, wherein,
said plurality of crowdsourcing platforms receive one or more tasks from one or more requestors, the one or more tasks being crowdsourced to one or more workers,
each software adaptor is configured specific to one of the crowdsourcing platforms such that, based on accessed requirements stored at a knowledgebase for transferring information to the repository from the crowdsourcing platforms, each software adaptor retrieves information from a corresponding crowdsourcing platform and determines information that is mapped from a source stream of information to a target stream of information to create and update the repository, and
each software adaptor determines how to transform the mapped information for each crowdsourcing platform by accessing the knowledgebase in order to update the repository;
receiving a first input pertaining to an input criteria, wherein said input criteria corresponds to selection of a set of attributes from the plurality of attributes;
receiving a search query from one or more stakeholders associated with the plurality of crowdsourcing platforms, wherein the search query comprises one or more required values of the selected set of attributes;

identifying one or more crowdsourcing platforms from the plurality of crowdsourcing platforms based on the one or more required values of the selected set of attributes;

recommending a set of crowdsourcing platforms from the one or more identified crowdsourcing platforms; and updating the repository using the software adaptors for the plurality of crowdsourcing platforms, wherein the repository is updated proactively by injecting a batch of tasks to a particular crowdsourcing platform and correspondingly updating, using the software adaptors configured for the particular crowdsourcing platform, the repository based on the injected batch of tasks.

2. The computer-implemented method of claim 1, wherein the recommending is performed based on the values of the plurality of attributes associated with each crowdsourcing platform in the set of crowdsourcing platforms, and the one or more required values of the selected set of attributes.

3. A computer-implemented method of claim 1, wherein the plurality of attributes comprises a set of functional attributes and a set of non-functional attributes.

4. A computer implemented method of claim 3, wherein the set of functional attributes comprises at least one of type of crowdsourcing platform, type of crowdsourcing task supported by crowdsourcing platform, or features supported by crowdsourcing platform.

5. A computer-implemented method of claim 3, wherein the set of non-functional attributes comprises at least one of cost, accuracy, response time, or task completion rate.

6. A computer implemented method of claim 1 further comprising classifying the one or more required values of the selected set of attributes into one or more information dimensions, wherein the one or more information dimensions correspond to the selected set of attributes.

7. A computer implemented method of claim 1, wherein the updating comprises extracting, by the corresponding software adaptor, the values of one or more of the plurality of attributes associated with each of the plurality of crowdsourcing platforms in the repository.

8. A computer-implemented method of claim 1 further comprising creating at least one of the software adaptors based on at least a set of plurality of non-functional attributes.

9. A computer implemented method of claim 1 further comprising configuring the software adaptors for each of the plurality of crowdsourcing platforms.

10. A computer-implemented method of claim 1 further comprising providing one or more graphical user interfaces (GUI) for creating customized views for analysis of each of the plurality of crowdsourcing platforms.

11. The computer-implemented method of claim 1, wherein updating the repository further comprises updating the repository reactively by using the software adaptors and knowledgebase to extract updated values from the crowdsourcing platforms and updating the values stored at the repository in real time at predefined time intervals.

12. A crowdsourcing directory system comprising:
one or more processors configured to:
create, using a plurality of software adaptors, a repository of information on a plurality of crowdsourcing platforms, the information comprising values of a plurality of attributes associated with each of the plurality of crowdsourcing platforms, wherein said plurality of crowdsourcing platforms receive one or more tasks from one or more requestors, the one or more tasks being crowdsourced to one or more workers, each software adaptor is configured specific to one of the crowdsourcing platforms such that, based on accessed requirements stored at a knowledgebase for transferring information to the repository from the crowdsourcing platforms, each software adaptor retrieves information from a corresponding crowdsourcing platform and determines information that is mapped from a source stream of information to a target stream of information to create and update the repository, and each software adaptor determines how to transform the mapped information for each crowdsourcing platform by accessing the knowledgebase in order to update the repository;

receive a first input pertaining to an input criteria, wherein said input criteria corresponds to selection of a set of attributes from the plurality of attributes;

receive a search query from one or more stakeholders associated with the plurality of crowdsourcing platforms, wherein the search query comprises one or more required values of the selected set of attributes;

identify one or more crowdsourcing platforms from the plurality of crowdsourcing platforms based on the one or more required values of the selected set of attributes;

recommend a set of crowdsourcing platforms from the one or more identified crowdsourcing platforms; and update the repository of the plurality of crowdsourcing platforms using the software adaptors for the plurality of crowdsourcing platforms, wherein the repository is updated proactively by injecting a batch of tasks to a particular crowdsourcing platform and correspondingly updating, using the software adaptors configured for the particular crowdsourcing platform, the repository based on the injected batch of tasks.

13. The crowdsourcing directory system of claim 12, wherein, using the software adaptors and knowledgebase to extract updated values from the crowdsourcing platforms, the values stored at the repository corresponding to the plurality of attributes for each of the plurality of crowdsourcing platforms are updated in real time at predefined time intervals.

14. A computer program product for use with a computer, the computer program product comprising a non-transitory computer-usable medium storing a computer-readable program code embodied therein, the computer-readable program code being executable by one or more processors in the computer to:

create, using a plurality of software adaptors, a repository of information on a plurality of crowdsourcing platforms the information comprising values of a plurality of attributes associated with each of the plurality of crowdsourcing platforms, wherein, said plurality of crowdsourcing platforms receive one or more tasks from one or more requestors, the one or more tasks being crowdsourced to one or more workers, each software adaptor is configured specific to one of the crowdsourcing platforms such that, based on accessed requirements stored at a knowledgebase for transferring information to the repository from the crowdsourcing platforms, each software adaptor retrieves information from a corresponding crowdsourcing platform and determines information that is mapped from a source stream of information to create and update the repository, and each software adaptor determines how to transform the mapped information for each crowdsourcing platform by accessing the knowledgebase in order to update the repository;

receive a first input pertaining to an input criteria, wherein said input criteria corresponds to selection of a set of attributes from the plurality of attributes;

receive a search query from one or more stakeholders associated with the plurality of crowdsourcing platforms, wherein the search query comprises one or more required values of the selected set of attributes;

identify one or more crowdsourcing platforms from the plurality of crowdsourcing platforms based on the one or more required values of the selected set of attributes;

recommend a set of crowdsourcing platforms from the one or more identified crowdsourcing platforms; and update the repository using the software adaptors for the plurality of crowdsourcing platforms, wherein the repository is updated proactively by injecting a batch of tasks to a particular crowdsourcing platform and correspondingly updating, using the software adaptors configured for the particular crowdsourcing platform, the repository based on the injected batch of tasks.

* * * * *